Oct. 16, 1923. 1,471,072
A. SONANDER
AUTOMATIC SCALE
Filed Aug. 13, 1921   2 Sheets-Sheet 2
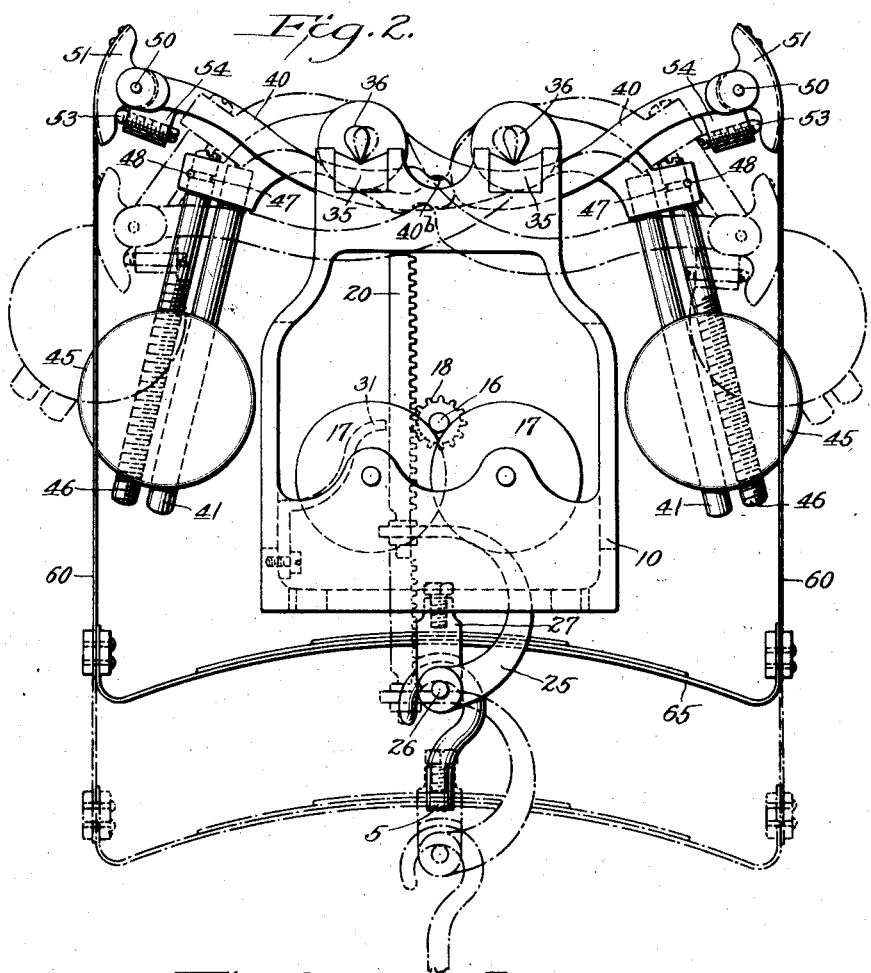
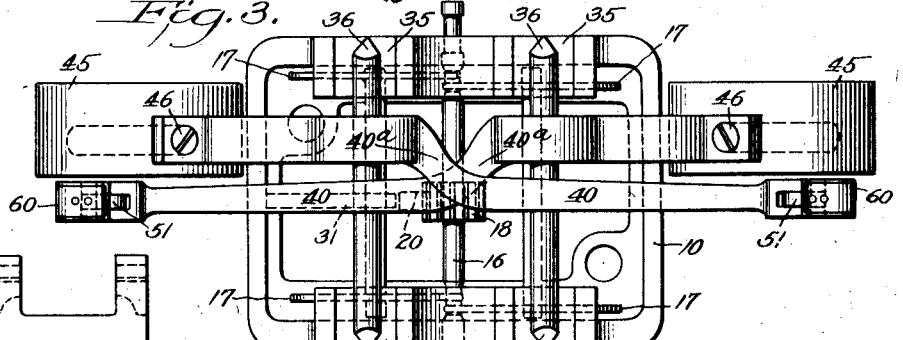
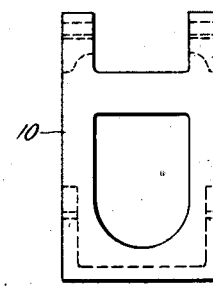
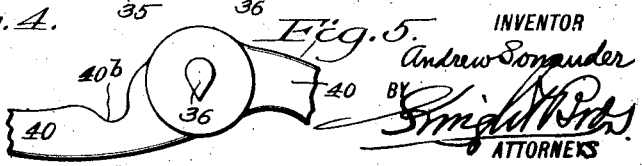

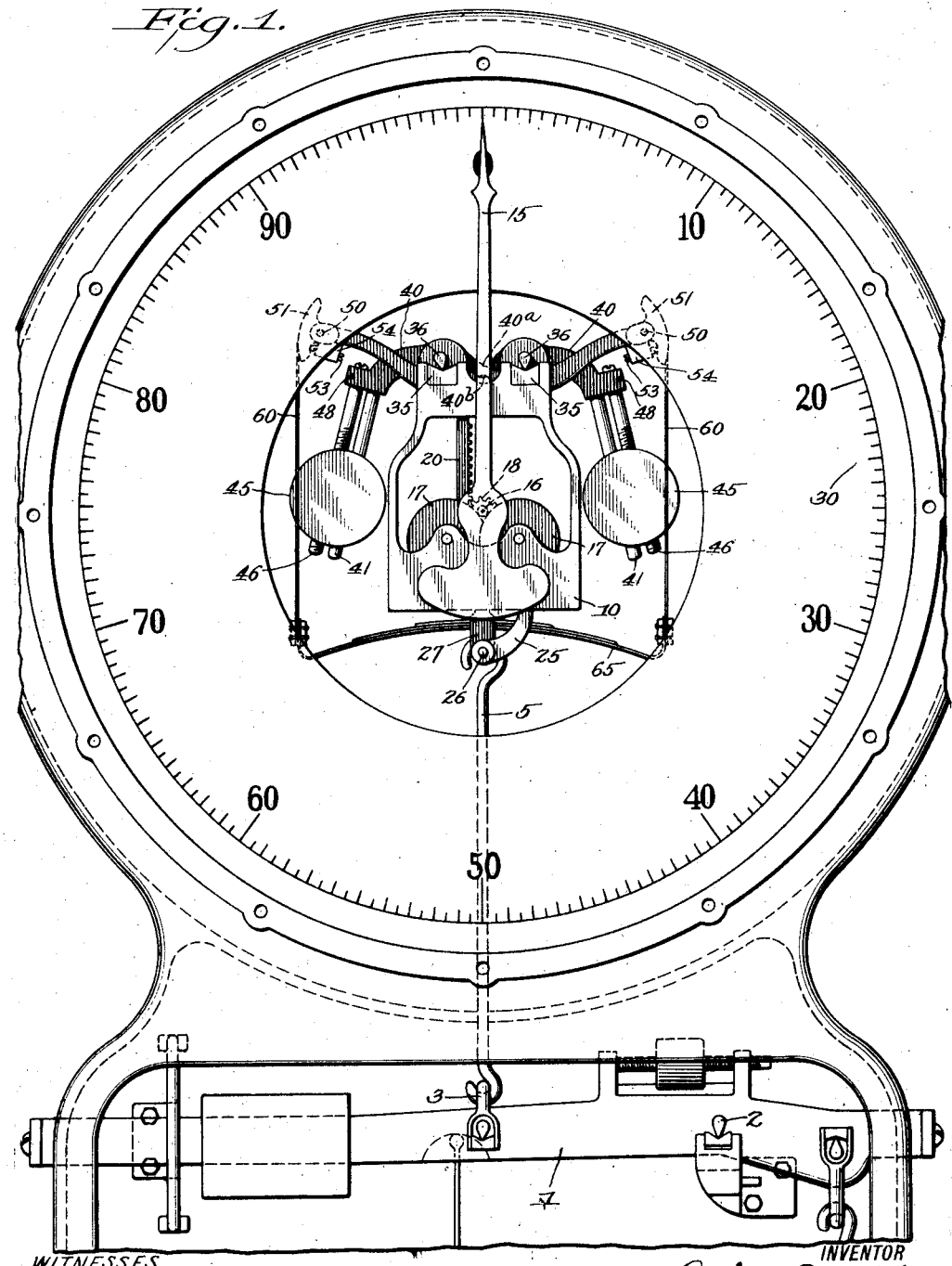

Patented Oct. 16, 1923.

1,471,072

UNITED STATES PATENT OFFICE.

ANDREW SONANDER, OF RUTLAND, VERMONT, ASSIGNOR TO HOWE SCALE COMPANY, OF RUTLAND, VERMONT, A CORPORATION OF VERMONT.

AUTOMATIC SCALE.

Application filed August 13, 1921. Serial No. 492,024.

*To all whom it may concern:*

Be it known that I, ANDREW SONANDER, a citizen of the United States, and resident of Rutland, county of Rutland, and State of Vermont, have invented certain new and useful Improvements in Automatic Scales, of which the following is a specification.

The present invention relates to improvements in automatic scales of the type in which a pair of pivoted fulcrum levers are connected to cam segments and tapes with the draft rod of the scale mechanism. The object of the present invention is to simplify and improve the pendulum mechanism of this type of scale with a view to reducing the angular movement of the pendulum levers upon their pivots and lessening the arc of travel of the gravity weights, thereby producing a more equal registration of the indicator upon the scale dial. In order to economize space, the pendulum levers are fulcrumed near the center of the dial and are formed with relatively long arms carrying the cam segments, which arms are arranged to cross between their pivots so as to present the cam segments in a common, transverse plane and the pendulum weights in a parallel, common plane. The cam segments adjustably mounted upon the ends of the oppositely extending pendulum arms are connected to the usual steel tapes with the ends of an equalizer bar which is preferably in the form of a leaf spring centrally supported by a suitable coupling link, to which is connected a crescent-shaped arm attached to the rack bar, which meshes with the pinion on the indicator shaft. The draft rod of the scale is also connected with the coupling of the spring equalizer bar. The leaf spring absorbs the shocks of suddenly-applied loads and thus avoids damaging the tapes or unseating the pivots from their bearings. The connection of the rack bar with the spring coupling by the crescent-shaped arm, which is loosely pivoted to the coupling, provides the necessary freedom to prevent binding between the rack bar and pinion in the event of the tape swinging laterally. In addition to the features mentioned, the pendulum weights are adjustably mounted upon their supports by a novel adjusting device, which is simple and convenient of operation and effectively guards against the weights jarring loose or becoming disarranged from their proper adjusted position.

In order that my invention may be fully understood, it will first be described with reference to the accompanying drawings and afterwards pointed out more particularly in the annexed claims. In said drawings:—

Figure 1 is a partial, front elevation of a scale mechanism having my improved pendulum lever mechanism applied thereto.

Figure 2 is a similar view of the improved mechanism on a larger scale.

Figure 3 is a plan view of the same.

Figures 4 and 5 are detail views of parts of the mechanism.

1 is a main scale lever of well known construction, fulcrumed at 2 and carrying a fulcrum yoke 3, to which is hooked the lower end of the draft rod 5.

10 is a suitable frame for supporting the equalizing pendulum levers and indicator mechanisms. The indicator hand 15 is mounted upon the indicator shaft 16, which is rotatably supported upon the overlapping bearing rolls 17 and carries between its ends a pinion 18, which meshes with a vertical rack bar 20, to the lower end of which is adjustably attached a crescent-shaped arm 25 loosely pivoted at 26 to a yoke 27, to which the upper end of draft rod 5 is hooked. 30 is the usual dial, with which the hand 15 registers. 31 is a guide arm to hold rack bar 20 in mesh with pinion 18.

The upper part of the frame 10 supports the bearing blocks 35 upon which are fulcrumed the knife-edge pivot bars 36 of the pendulum levers. Each pendulum lever comprises a long arm 40 mounted upon one of the knife edge bars 36 at the proper point between its ends and carrying upon its short end a rigid guide rod 41 extending downwardly at an angle to the general length of the lever and having loosely mounted thereon an adjustable weight in the form of a ball or disk 45. The weight 45 is formed with two parallel channels extending through it, one of which loosely fits the guide rod 41, while the other is threaded to receive a threaded adjusting screw 46 rotatably mounted in the lever 40 and formed near its head with an annular groove 47, in which engages a pin or stud 48 arranged to prevent the displacement of the screw in the pendulum lever, while at the same time permitting it to be rotated to cause the weight 45 to move upwardly or downwardly upon the guide rod 41 in effecting the proper adjustment. The opposite end of each of the pendulum levers 40 has pivotally mounted on it at 50 a cam segment 51, which is held in the desired adjusted position upon the pendulum lever by means of an adjusting screw 52 threaded through a lug 54 of pendulum lever 40 and engaging the segment 51 to adjust it and hold it in the desired position.

The fulcrums for the pendulum levers 40 are arranged close to but on opposite sides of the central plane of the indicator shaft 6 and the opposite ends of each of the pendulum levers are arranged in different transverse planes with a twisted or diagonal central portion indicated at 40^A in Figure 3 so that the pendulum levers will cross each other and present the cam segments at the opposite ends of the intersecting levers in the same transverse, vertical plane. The diagonal crossing portion 40^A of pendulum levers 40 are notched upon their adjacent faces as indicated at 40^B in Figure 5.

Attached to each of the cam segments 51 are the metal tapes 60, which tapes are clamped at their lower ends to the opposite up-turned ends of an equalizer bar 65, which is preferably made in the form of a leaf or laminated spring extending transversely of the scale mechanism approximately the distance between the two cam segments. This leaf spring equalizer bar 65 is clamped centrally in the yoke 27 above referred to, which constitutes the connection between the draft rod and the equalizer bar and indicator mechanism.

The connection of draft rod 5 with rack bar 20 through crescent link 25 tends to hold the rack bar in mesh.

I claim:—

1. The combination with suitable scale mechanism including a draft rod and an indicator mechanism, of a pair of crossing or intersecting pendulum levers having their corresponding ends presented in a common transverse plane, and means connecting said levers with said draft rod.

2. The combination with suitable scale mechanism including a draft rod and an indicator mechanism, of a pair of overlapping crossed or intersected pendulum levers fulcrumed in parallel planes and having their corresponding ends presented in a common transverse plane, and means connecting said levers with said draft rod.

3. The combination with suitable scale mechanism including a draft rod and an indicator mechanism, of a pair of crossing fulcrumed pendulum levers carrying weights and cam segments at their opposite ends arranged to present their cam segments in a common transverse plane, and their weights in a common plane parallel to the plane of said segments, and an equalizer bar suitably connected with said cam segments, said draft rod and said indicator mechanism.

4. The combination with suitable scale mechanism including a draft rod and an indicator mechanism, of a pair of overlapping fulcrumed pendulum levers carrying weights and cam segments at their opposite ends, said levers being arranged to cross or intersect each other to present the cam segments in a common transverse plane, and an equalizer bar suitably connected with said cam segments, said draft rod and said indicator mechanism.

5. The combination with suitable scale mechanism including a draft rod and an indicator mechanism, of a pair of overlapping fulcrumed pendulum levers, each carrying a weight and a cam segment at its opposite ends, said levers being arranged to cross or intersect each other to present the cam segments in a common transverse plane, tapes attached to and operating upon said segments, an equalizer bar connected at its opposite ends to said tapes, and means connecting said equalizer bar with said draft rod and said indicator mechanism.

6. The combination with suitable scale mechanism including a draft rod and an indicator mechanism, of a pair of overlapping fulcrumed pendulum levers, each carrying a weight and a cam segment at its opposite ends, said levers being arranged to cross or intersect each other to present the cam segments in a common transverse plane, tapes attached to and operating upon said segments, an equalizer bar connecting said draft rod with said tapes and a pivoted connection between said equalizer bar and said indicator mechanism.

7. In a scale mechanism, the combination of a pair of fulcrumed crossed pendulum levers carrying cam segments and weights at their opposite ends, tapes attached to and operating upon said cam segments, a laminated spring equalizer bar extending between and connected to the ends of said tapes, a draft rod centrally connected with said equalizer bar and an indicator mechanism suitably connected with said equalizer bar.

8. In a scale mechanism, the combination of a pair of fulcrumed pendulum levers carrying cam segments and weights at their opposite ends, tapes operating upon said cam segments, an equalizer bar extending between and connected to the ends of said tapes, a draft rod suitably connected with said equalizer bar, an indicator mechanism including a rack bar and pinion, and a curved arm connected with said rack bar and pivotally connected with said equalizer bar.

9. In a scale mechanism, the combination of a pair of fulcrumed pendulum levers carrying cam segments and weights at their opposite ends, tapes operating upon said cam segments, an equalizer bar extending between and connected to the ends of said tapes, a draft rod centrally connected with said equalizer bar, an indicator mechanism including a rack bar and pinion, and a curved arm adjustably connected with said rack bar and pivotally connected with said equalizer bar.

10. In a scale mechanism, the combination of a pair of fulcrumed pendulum levers each having an angularly disposed guide rod, a weight mounted to slide upon said guide rod, and formed with two parallel channels, one of which is threaded, an adjusting screw mounted in the lever so as to rotate freely therein and be held against longitudinal displacement thereon, said adjusting screw being screwed into the threaded channel in said weight, suitable scale mechanism including a draft rod and indicator mechanism, and means connecting said pendulum levers with said draft rod and indicator mechanism.

11. In a scale mechanism, the combination of a pair of fulcrumed pendulum levers having rigid angularly disposed guide rods, weights slidingly mounted upon said guide rods, adjusting screws rotatably mounted in the levers and formed with annular grooves engaged by pins to hold them against longitudinal displacement, said adjusting screws being threaded through openings in said weights, suitable scale mechanism including a draft rod and indicator mechanism, and means connecting said pendulum levers with said draft rod and indicator mechanism.

ANDREW SONANDER.